(12) United States Patent
Hamdoon et al.

(10) Patent No.: US 10,137,936 B2
(45) Date of Patent: Nov. 27, 2018

(54) COLLAPSIBLE VEHICLE ROOF SUPPORT ASSEMBLY

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Matthew Alan Niesluchowski, Clarkston, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 15/471,304

(22) Filed: Mar. 28, 2017

(65) Prior Publication Data

US 2018/0281865 A1    Oct. 4, 2018

(51) Int. Cl.
| | |
|---|---|
| *B62D 25/06* | (2006.01) |
| *B62D 21/15* | (2006.01) |
| *B62D 27/06* | (2006.01) |
| *B62D 29/00* | (2006.01) |

(52) U.S. Cl.
CPC .......... *B62D 21/157* (2013.01); *B62D 25/06* (2013.01); *B62D 27/06* (2013.01); *B62D 29/008* (2013.01)

(58) Field of Classification Search
CPC ...... B62D 21/157; B62D 25/06; B62D 27/06; B62D 29/008
See application file for complete search history.

(56) References Cited

U.S. PATENT DOCUMENTS

| | | | |
|---|---|---|---|
| 8,042,863 B2 | 10/2011 | Nydam | |
| 8,662,573 B2 | 3/2014 | Vantrease et al. | |
| 2006/0249977 A1 | 11/2006 | Stephenson et al. | |
| 2009/0108634 A1* | 4/2009 | Reed | B62D 25/04 296/210 |
| 2010/0140982 A1* | 6/2010 | Hosaka | B62D 25/06 296/210 |
| 2010/0140984 A1 | 6/2010 | Murray | |
| 2013/0082484 A1* | 4/2013 | Wagner | B62D 25/06 296/210 |
| 2014/0008940 A1* | 1/2014 | Adamski | B62D 25/06 296/210 |

FOREIGN PATENT DOCUMENTS

| | | | | |
|---|---|---|---|---|
| DE | 202014104732 U1 * | 10/2014 | ............. | B62D 25/04 |
| JP | 2013067349 A * | 4/2013 | ............. | B62D 25/06 |

* cited by examiner

*Primary Examiner* — Lori L Lyjak
(74) *Attorney, Agent, or Firm* — Brooks Kushman P.C.

(57) ABSTRACT

A vehicle includes a body structure, a side bracket secured to the body structure, and a spacer bracket secured to the side bracket. The spacer bracket extends in a lateral direction toward an interior of the vehicle. The vehicle further includes a roof bow secured to the spacer bracket. The roof bow extends in the lateral direction toward the interior of the vehicle. The roof bow may be secured to the spacer bracket through at least one fastener adapted to shear under a predetermined shear stress. The roof bow may be secured to the spacer bracket such that a distal end of the roof bow is disposed in spaced relation relative to a distal end of the of the spacer bracket. The roof bow may be secured to a K-brace which extends toward roof rails.

20 Claims, 3 Drawing Sheets

COLLAPSIBLE VEHICLE ROOF SUPPORT ASSEMBLY

TECHNICAL FIELD

This disclosure relates generally to vehicle structures, and more particularly to a roof support assembly and side impact structure for a vehicle.

BACKGROUND

Roof bows are attached to vehicle roof structures to strengthen the roof assembly and support the roof rails and roof panel. Roof support pillars are typically located between the windows and doors of a vehicle. Roof support pillars are frequently identified as A, B, C and in some instances D-Pillars depending on the vehicle style. A B-Pillar is generally located immediately behind the front door of a vehicle and is traditionally used to mount the rear door hinges and associated rear doors. The B-Pillar often plays an important role in determining roof strength and the degree of side impact intrusion.

Passenger vehicle designs are tested for roof strength and side impact strength. Improving side impact strength is often addressed by increasing the section size and the thickness of the structural components of the roof rail. Increasing the section size and thickness of the roof rails adds weight to the vehicle, often adds manufacturing costs, and may reduce visibility below the roof rail.

SUMMARY

A vehicle includes a body structure, a side bracket secured to the body structure, and a spacer bracket secured to the side bracket. The spacer bracket may be formed of aluminum. The spacer bracket extends in a lateral direction toward an interior of the vehicle. The vehicle further includes a roof bow secured to the spacer bracket. The roof bow extends in the lateral direction toward the interior of the vehicle. The roof bow may be secured to the spacer bracket through at least one fastener adapted to shear under a predetermined shear stress. The at least one fastener may include a plurality of self-piercing rivets.

The roof bow may be secured to the spacer bracket such that a distal end of the roof bow is disposed in spaced relation relative to a distal end of the of the spacer bracket. For example, the distal end of the roof bow may be spaced between approximately two and six inches from the distal end of the spacer bracket.

In one approach, the spacer bracket defines a channel, and at least a portion of the roof bow is disposed within the channel. At least one self-piercing rivet may secure the roof bow to the spacer bracket within the channel. The portion of the roof bow disposed within the channel may be adapted to slide within the channel in the lateral direction toward the side bracket in response to the at least one fastener shearing.

The spacer bracket may also define at least one flange extending away from the channel, and the roof bow may include a corresponding flange. At least one self-piercing rivet may secure the roof bow flange to the spacer bracket flange.

In another approach, a method for assembling a collapsible vehicle roof structure assembly includes securing a spacer bracket to an upper portion of a vehicle body. The method further includes securing a roof bow to the spacer bracket through at least one fastener such that a distal end of the roof bow is disposed in spaced relation relative to a distal end of the of the spacer bracket.

In another approach, a collapsible vehicle roof structure assembly includes a spacer bracket adapted to be secured to a vehicle body structure. The vehicle roof structure assembly further includes a roof bow adapted to overlap the spacer bracket and adapted to be secured to the spacer bracket using at least one fastener adapted to shear under a predetermined shear stress. In a secured configuration, a distal end of the roof bow is spaced apart from a distal end of the of the spacer bracket.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
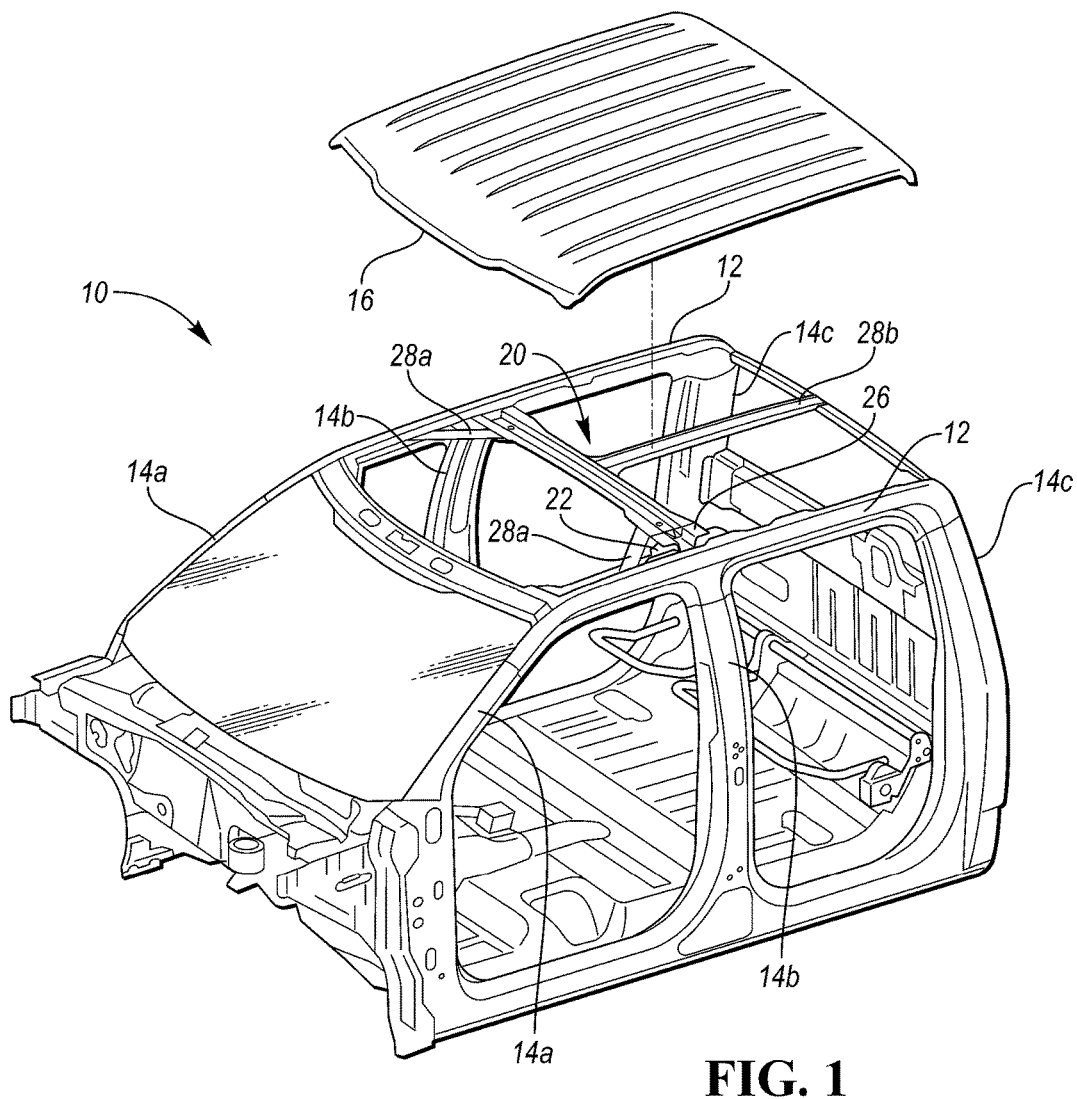
FIG. 1 is a fragmentary perspective view of a vehicle body structure with a roof support assembly structure.

Referring now to FIG. 1, a vehicle body structure 10 is shown for a passenger compartment of a vehicle. The vehicle body structure 10 may be the body shell of the vehicle. The vehicle body structure 10 is often the skeletal structure to which various subsystems are subsequently attached. In the approach shown, the vehicle body structure 10 may be a truck body structure. However, other body structures are contemplated. The vehicle body structure 10 may also be a common or shared vehicle platform suitable for various powertrains. For example, a given vehicle body structure 10 may be used for both common internal combustion engine powertrains and alternate powertrains such as diesel or hybrid electric vehicles.

The vehicle body structure 10 includes roof rails 12 and support pillars 14 (e.g., A-Pillars 14*a*, B-Pillars 14*b*, and C-Pillars 14*c*) extending from the roof rails 12. A roof panel 16 extends between the roof rails 12.

Figure 2:
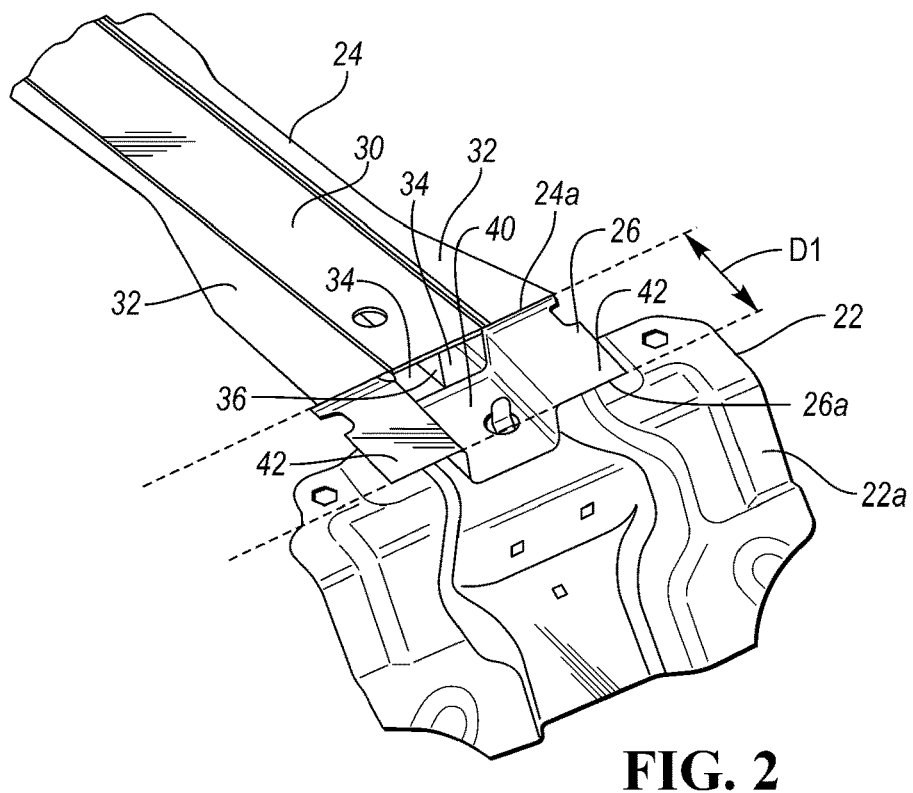
FIG. 2 is a perspective view of components of a roof support assembly structure in a first configuration.

The vehicle body structure 10 also includes a roof support assembly 20. The roof assembly 20 includes handoff brackets 22 (or side brackets). In one approach, the handoff bracket 22 is secured to the roof rails 12, for example, adjacent the pillars 14. With reference momentarily to FIG. 2, an outward-facing wall 22a of a handoff bracket 22 may engage and be secured to an inward-facing wall of a roof rail 12. The handoff brackets 22 may be formed of aluminum. In other approaches, the handoff brackets 22 are formed of stamped high strength steel or other suitable material. The handoff brackets 22 are fastened to the roof rails 12 using any suitable fastener, such as rivets (e.g., self-piercing rivets), nuts and bolts, or a combination thereof. In approaches, the handoff bracket 22 may be secured to other portions of the vehicle body structure 10, such as a pillar.

The roof support assembly 20 also includes a roof bow 24 extending between the roof rails 12. For example, the roof bow 24 may extend transversely relative to a longitudinal axis of the vehicle 10. In a preferred approach, the roof bow 24 is formed of extruded aluminum and may have 2.0 mm-3.0 mm thick walls.

A roof bow spacer (or spacer bracket) 26 connects the roof bow 24 to a handoff bracket 22 to support the roof bow 24 between the roof rails 12. The roof bow spacer 26 may be formed, for example, of aluminum. In other approaches, the roof bow spacer 26 is formed of stamped high strength steel or other suitable material. In a preferred approach, the roof support assembly 20 includes roof bow spacers 26 disposed at opposing ends of the roof bow 24

In one approach, the roof bow spacer 26 is a discrete component secured to handoff bracket 22. The roof bow spacer 26 may be, for example, four inches in length. The roof bow spacer 26 may overlap a portion of the handoff bracket 22, for example, by one inch. The roof bow 24 may overlap a portion of the roof bow spacer 26, for example, by one inch. In this approach, a distal end of the roof bow 24 (e.g., distal end 24a shown in FIG. 2) is spaced approximately two inches from the handoff bracket 22. In another approach, the roof bow spacer 26 is integrally formed with the handoff bracket 22. In still another approach, no handoff bracket is secured to the roof rail. In this approach, the roof bow spacer 26 may be secured directly to the roof rail or other component of the vehicle body.

The roof bow 24 may also be secured to the roof rails 12 by one or more braces 28. The braces may include one or more angled braces 28a, also referred to as "K-braces." Each K-brace 28a may be secured at one end to a top side of the roof rail 12, and at the opposite end to a bottom side of flange portions of the roof bow 24 to support the roof bow 24. The braces may include one or more cross braces 28b connecting a central region of the roof bow 24 to a rear region of the vehicle body structure 10.

Referring now to FIG. 2, the roof bow 24 includes a longitudinal body portion 30 and flange portions 32 extending from the body portion 30. The body portion 30 defines at least one, and preferably two inner channels 34. The inner channels 34 may be separated by an inner channel wall 36.

As shown in FIG. 2, the roof bow 24 may be secured to a handoff bracket 22 through a roof bow spacer 26. For example, a body portion 30 of the roof bow 24 may be disposed within a receiving channel 40 of the roof bow spacer 26 having interior geometries dimensioned to receive the body portion 30. The receiving channel 40 of the roof bow spacer may have exterior geometries dimensioned to permit the receiving channel 40 to be received in a receiving channel of a handoff bracket 22.

The roof bow spacer 26 may also include one or more spacer flanges 42. The spacer flanges 42 may be planar flanges having geometries corresponding to geometries of the flanges portions 32 of the roof bow 24 to facilitate engagement of the spacer flanges 42 with the flanges portions 32.

Figure 3:
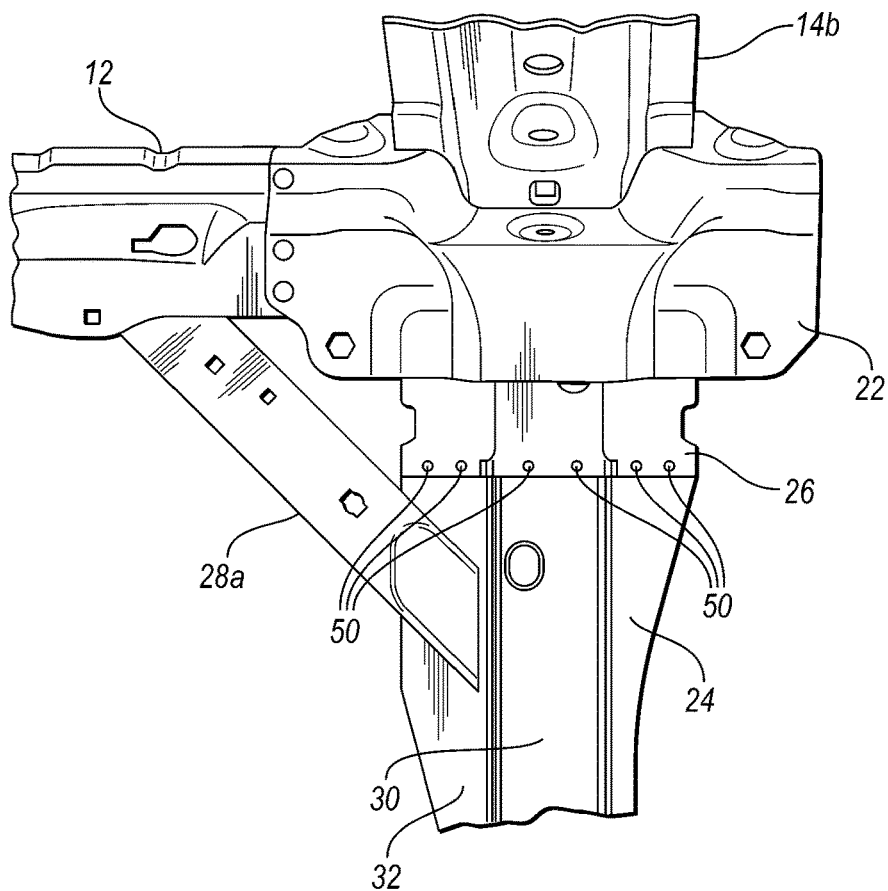
FIG. 3 is a bottom plan view of components of a roof support assembly structure in the first configuration.
Figure 4:
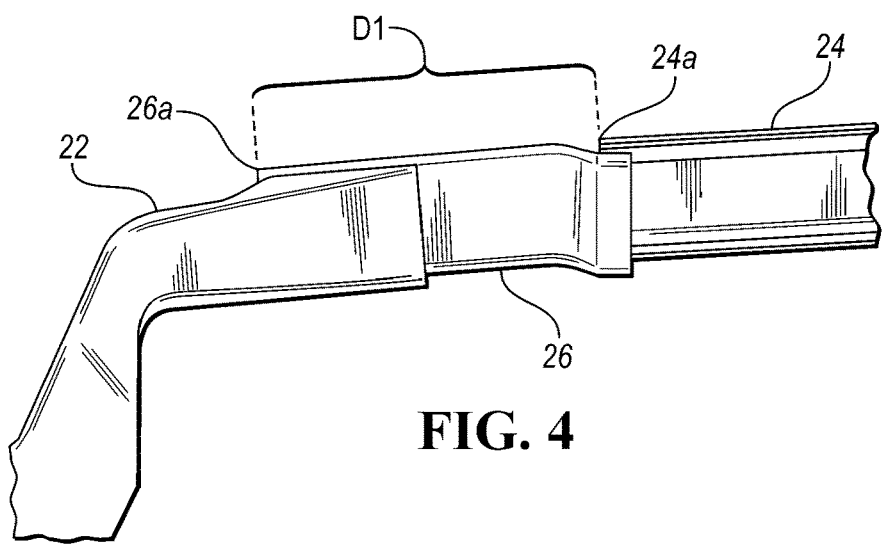
FIG. 4 is a side elevation view of components of a roof support assembly structure in the first configuration.

With reference to FIG. 3, an end of the roof bow 24 may be secured to the roof bow spacer 26 through mechanical fasteners 50. For example, one or more self-piercing rivets may be used to secure the roof bow 24 to the roof bow spacer 26. The fasteners 50 may be disposed at the interface of the body portion 30 of the roof bow 24 and the receiving channel 40 of the roof bow spacer 26. The fasteners 50 may also or instead be disposed at the interface of the flanges portions 32 of the roof bow 24 and the spacer flanges 42. In the exemplary arraignment shown in FIG. 3, six self-piercing rivets are used to secure an end of the roof bow 24 to the roof bow spacer 26. In this example, two self-piercing rivets may be disposed at the interface of a first flange portion 32 and a first spacer flange 42, two self-piercing rivets may be disposed at the interface of the body portion 30 of the roof bow 24 and the receiving channel 40 of the roof bow spacer 26, and two self-piercing rivets may be disposed at a second flange portion 32 and a second spacer flange 42. Other fastener arrangements are expressly contemplated herein.

In the assembled configuration, shown in FIGS. 1-4, the roof bow spacer 26 maintains a distal end of the roof bow 24 in spaced relation relative to an outward-facing wall of the handoff bracket 22. The mechanical fasteners 50 rigidly secure the roof bow 24 to the roof bow spacer 26 such that movement of the roof bow 24 relative to the roof bow spacer 26 is substantially or completely inhibited during normal operating conditions. As will be appreciated from this disclosure, the mechanical fasteners 50 are deigned to fail under high shear.

During a vehicle side impact, in some instances, the roof bow 24 may experience sideways momentum in the direction of the handoff bracket 22. If a distal end of the roof bow 24 (e.g., distal end 24a shown in FIG. 2) is displaced a sufficient distance relative to handoff bracket 22, the roof bow 24 may apply a push force on the roof panel 16 of the vehicle 10. The push force may occur, for example, at a connection zone between the roof panel 16 and the roof rail 12 proximate the roof bow 24. A sufficiently high push force may cause connectors between the roof panel 16 and the roof rail 12 to fail, thereby causing separation of the roof panel 16 from the roof rail 12.

The roof support assembly 20 according to the present disclosure maintains a distal end 24a of the roof bow 24 in spaced relation relative to the side of the vehicle during normal operating conditions. For example, referring to FIGS. 2 and 4, the roof bow spacer 26 maintains the distal end 24a of the roof bow 24 a first distance D1 from a distal end 26a of the roof bow spacer 26 during normal operating conditions. In one approach, the roof bow spacer 26 maintains the distal end 24a of the roof bow 24 a distance D1 of between approximately two and ten inches from the distal end 26a of the roof bow spacer 26. For example, the roof bow spacer 26 may maintain the distal end 24a of the roof bow 24 a distance D1 of four inches from the distal end 26a of the roof bow spacer 26.

In a preferred approach, fasteners 50 are adapted to shear when a predetermined shear stress is experienced by the fasteners 50, for example, during a vehicle side impact. The fasteners 50 may be selected such that they fail under a shear stress that exceeds the ultimate shear strength of the fastener material. Such a shear stress may correspond, for example, an impact load experienced when the vehicle 10 impacts a rigid, stationary object while traveling approximately 20 mph in a lateral direction. In another example, the predetermined force includes a force in a range of two kiloNewtons (kN) to ten kN, and more particularly, in a range of four kN to six kN. The K-brace 28a may be attached to the roof rails 12 and roof bow 24 to balance stress transferred from roof bow 24 to the spacer bracket 26 during low to medium shear stress applied on the fasteners 50.

Figure 5:
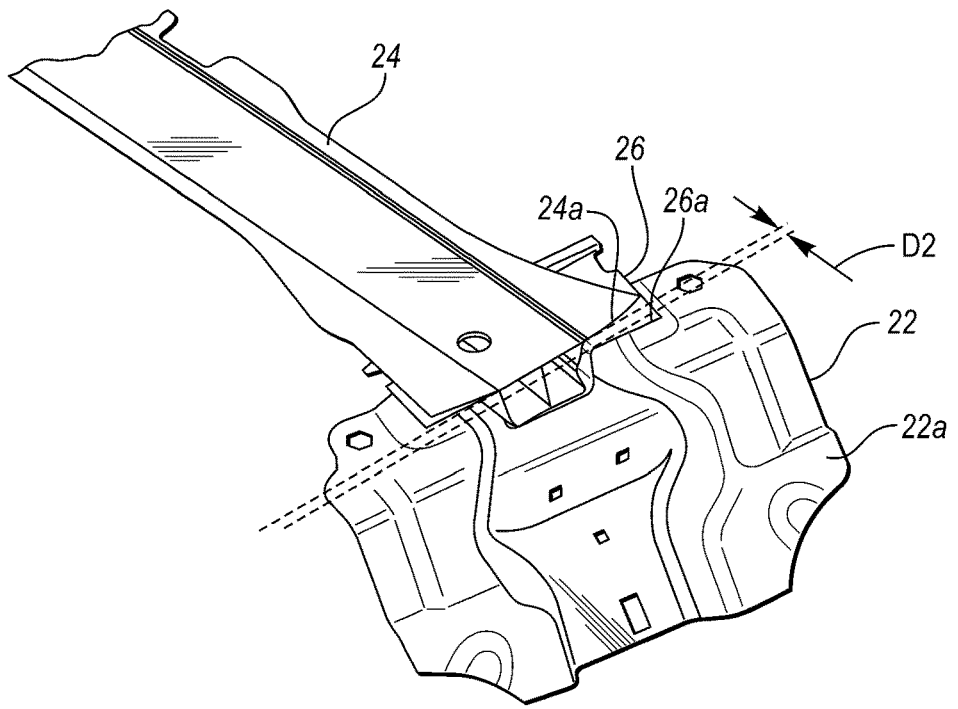
FIG. 5 is a perspective view of components of a roof support assembly structure in a second configuration.

With reference to FIG. 5, upon shearing of the fasteners 50, the roof bow 24 moves axially across the roof bow spacer 26 in the direction of the handoff bracket 22. In this configuration, the distance between the distal end 24a of the roof bow 24 and the distal end 26a of the roof bow spacer 26 is reduced to a second distance D2 less than the first distance D1. For example, the second distance D2 may be between zero and three inches. As such, the roof bow assembly 20 is a collapsible roof bow assembly.

In this way, during a side impact, the roof bow 24 must travel a given distance (e.g., equal to or greater than the first distance D1) before the roof bow 24 will impact a side portion of the vehicle. As appreciated, the first distance D1 is preferably selected so as to reduce the likelihood and/or the severity of the roof bow 24 impacting a side portion of the vehicle during a side impact.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:
a body structure;
a side bracket secured to the body structure;
a spacer bracket secured to the side bracket and extending in a lateral direction toward an interior of the vehicle; and
a roof bow secured to the spacer bracket and extending in the lateral direction toward the interior of the vehicle, wherein the roof bow is secured to the spacer bracket through at least one fastener adapted to shear under a shear stress, and wherein the roof bow is secured to the spacer bracket such that a distal end of the roof bow is disposed in spaced relation relative to a distal end of the of the spacer bracket.

2. The vehicle of claim 1, wherein the at least one fastener includes a plurality of self-piercing rivets.

3. The vehicle of claim 1, wherein the distal end of the roof bow is spaced between approximately two inches and six inches from the distal end of the spacer bracket.

4. The vehicle of claim 1, wherein the spacer bracket defines a channel, wherein at least a portion of the roof bow is disposed within the channel, and wherein the at least one fastener includes at least one self-piercing rivet securing the roof bow to the spacer bracket within the channel.

5. The vehicle of claim 4, wherein the spacer bracket defines at least one flange extending away from the channel, wherein the roof bow includes a corresponding flange, and wherein the at least one fastener includes at least one self-piercing rivet securing the roof bow flange to the spacer bracket flange.

6. The vehicle of claim 4, wherein the portion of the roof bow disposed within the channel is adapted to slide within the channel in the lateral direction toward the side bracket in response to the at least one fastener shearing.

7. The vehicle of claim 1, wherein the spacer bracket is formed of aluminum.

8. A method for assembling a collapsible vehicle roof structure assembly, comprising:
securing a spacer bracket to an upper portion of a vehicle body; and
securing a roof bow to the spacer bracket using at least one fastener such that a distal end of the secured roof bow is spaced at least two inches away from a distal end of the of the spacer bracket.

9. The method of claim 8, wherein securing the spacer bracket to the upper portion of the vehicle body includes securing the spacer bracket to a side bracket disposed at the upper portion of the vehicle body.

10. The method of claim 8, wherein securing the roof bow to the spacer bracket includes applying a plurality of self-piercing rivets to secure the roof bow to the spacer bracket.

11. The method of claim 8, wherein securing the roof bow to the spacer bracket includes securing the roof bow to the spacer bracket such that a distal end of the roof bow is spaced between approximately two and six inches from a distal end of the spacer bracket.

12. The method of claim 8, wherein the spacer bracket defines a channel, and wherein securing the roof bow to the spacer bracket includes securing at least a portion of the roof bow to the spacer bracket within the channel using at least one self-piercing rivet.

13. The method of claim 12, wherein the spacer bracket defines at least one flange extending away from the channel, wherein the roof bow includes a corresponding flange, and wherein securing the roof bow to the spacer bracket includes securing the roof bow flange to the spacer bracket flange using at least one self-piercing rivet.

14. A collapsible vehicle roof structure assembly comprising:
a spacer bracket adapted to be secured to a vehicle body structure; and
a roof bow adapted to overlap the spacer bracket and be secured to the spacer bracket using at least one fastener adapted to shear under a shear stress;
wherein in a secured configuration, a distal end of the roof bow is spaced apart from a distal end of the of the spacer bracket.

15. The collapsible vehicle roof structure assembly of claim 14, wherein the at least one fastener includes a plurality of self-piercing rivets.

16. The collapsible vehicle roof structure assembly of claim 14, wherein the distal end of the roof bow is spaced between approximately two and six inches from the distal end of the spacer bracket.

17. The collapsible vehicle roof structure assembly of claim 14, wherein the spacer bracket defines a channel, and wherein at least a portion of the roof bow is disposed within the channel, and wherein the at least one fastener includes at least one self-piercing rivet securing the roof bow to the spacer bracket within the channel.

18. The collapsible vehicle roof structure assembly of claim 17, wherein the spacer bracket defines at least one flange extending away from the channel, wherein the roof bow includes a corresponding flange, and wherein the at least one fastener includes at least one self-piercing rivet securing the roof bow flange to the spacer bracket flange.

19. The collapsible vehicle roof structure assembly of claim 17, wherein the portion of the roof bow disposed within the channel is adapted to slide within the channel in an axial direction in response to the at least one fastener shearing.

20. The collapsible vehicle roof structure assembly of claim 14, wherein the spacer bracket is formed of aluminum.

* * * * *